United States Patent [19]
Konosu et al.

[11] Patent Number: 5,640,684
[45] Date of Patent: Jun. 17, 1997

[54] RADIO DATA COMMUNICATION SYSTEM COMPRISING A COMMON BASE RADIO STATION AND HANDY RADIO TERMINALS

[75] Inventors: Koji Konosu, Anjo; Takeshi Watanabe, Kariya; Yukiko Uno, Oobu; Yoshimi Kitazumi, Chiryu; Tadao Nojiri, Oobu, all of Japan

[73] Assignee: Nippondenso Co., Ltd., Kariya, Japan

[21] Appl. No.: 512,648

[22] Filed: Aug. 8, 1995

[30] Foreign Application Priority Data

Aug. 8, 1994 [JP] Japan .................................. 6-186122
Jun. 23, 1995 [JP] Japan .................................. 7-158211

[51] Int. Cl.$^6$ .................................................. H04B 17/00
[52] U.S. Cl. ...................... 455/67.7; 455/67.3; 455/67.4; 455/226.4
[58] Field of Search .................... 455/67.7, 67.1, 455/67.3, 67.4, 69, 9, 54.1, 226.1, 226.2, 226.3, 226.4; 379/34, 1, 29

[56] References Cited

U.S. PATENT DOCUMENTS 4,890,332 12/1989 Takahashi ........................... 455/226.4
5,471,650 11/1995 Vexler et al. ........................ 455/69

FOREIGN PATENT DOCUMENTS 62-24134  10/1987  Japan .
5207544    8/1993  Japan .
5259984  10/1993  Japan .

*Primary Examiner*—Reinhard J. Eisenzopf
*Assistant Examiner*—Nguyen Vo
*Attorney, Agent, or Firm*—Cushman Darby & Cushman IP Group of Pillsbury Madison & Sutro, LLP

[57] ABSTRACT

A portable radio station 1a transmits a communication-quality-confirmation pattern data "f" to a stationary radio station 2a, wherein a first communication quality information "1" is produced by measuring erroneous bits of the received signal. The first communication quality information "1" is transmitted from the stationary radio station 2a to the portable radio station 1a, together with a communication-quality confirmation pattern data "n". The portable radio station 1a receives both the first communication quality information "1" and the communication-quality confirmation pattern data "n", and produces a second communication quality information by measuring erroneous bits of the received signal. Then, the first and second communication quality information are independently displayed on a display section 18 of the portable radio station 1a.

10 Claims, 9 Drawing Sheets

1a-PORTABLE RADIO STATION
2a-STATIONARY RADIO STATION

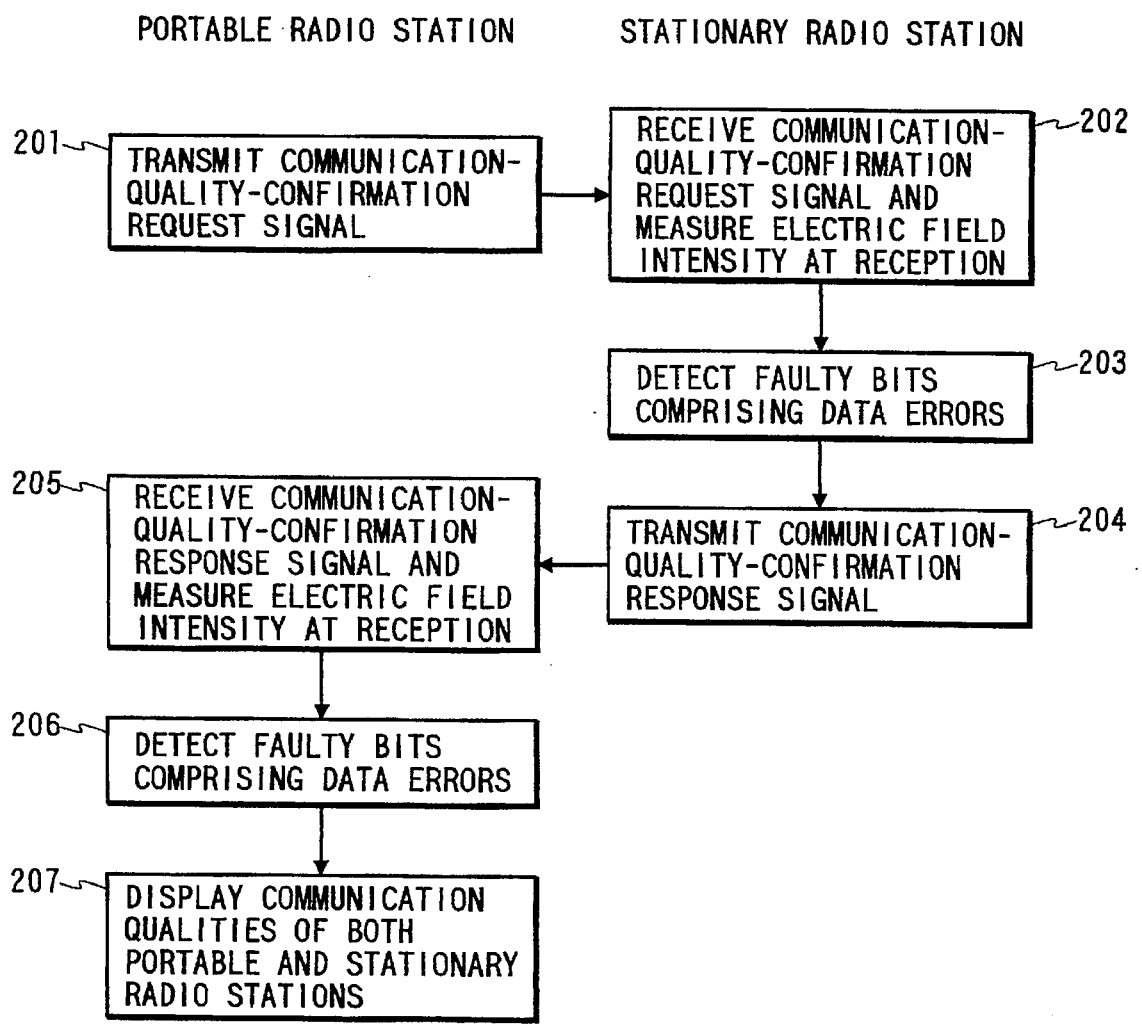

FIG. 6

REQUEST SIGNAL FOR CONFIRMING COMMUNICATION QUALITY

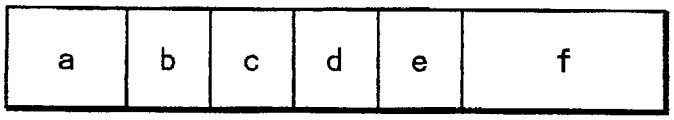

- a : SYNC CODE
- b : OPPONENT STATION ADDRESS
- c : OWN STATION ADDRESS
- d : QUALITY-CONFIRMATION-REQUEST SIGNAL ID CODE
- e : CONTROL SECTION ERROR-CORRECTING CODE
- f : QUALITY-CONFIRMATION PATTERN DATA

FIG. 7

RESPONSE SIGNAL FOR CONFIRMING COMMUNICATION QUALITY

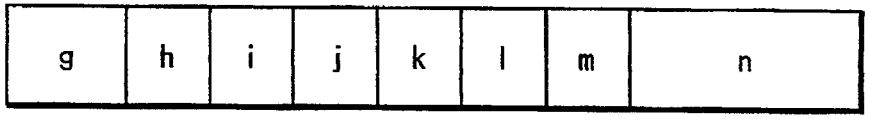

- g : SYNC CODE
- h : OPPONENT STATION ADDRESS
- i : OWN STATION ADDRESS
- j : QUALITY-CONFIRMATION-RESPONSE SIGNAL ID CODE
- k : ELECTRIC FIELD INTENSITY AT RECEPTION
- l : TOTAL NUMBER OF FAULTY BITS IN QUALITY-CONFIRMATION PATTERN DATA
- m : CONTROL SECTION ERROR-CORRECTING CODE
- n : QUALITY-CONFIRMATION PATTERN DATA

FIG. 8

COMMUNICATION QUALITY MEASUREMENT DATA DISPLAY SCREEN

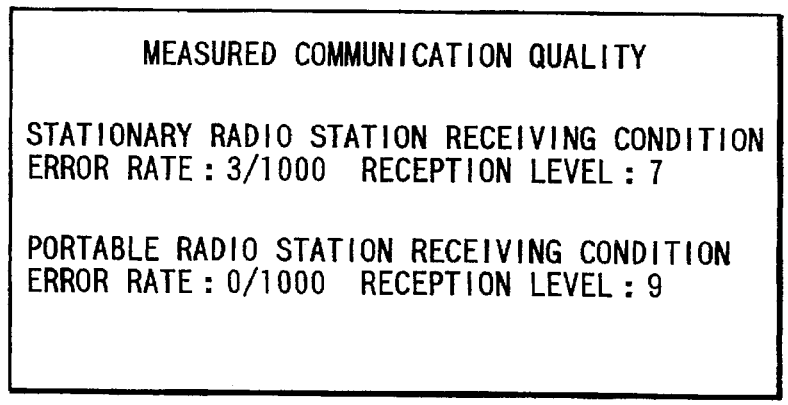

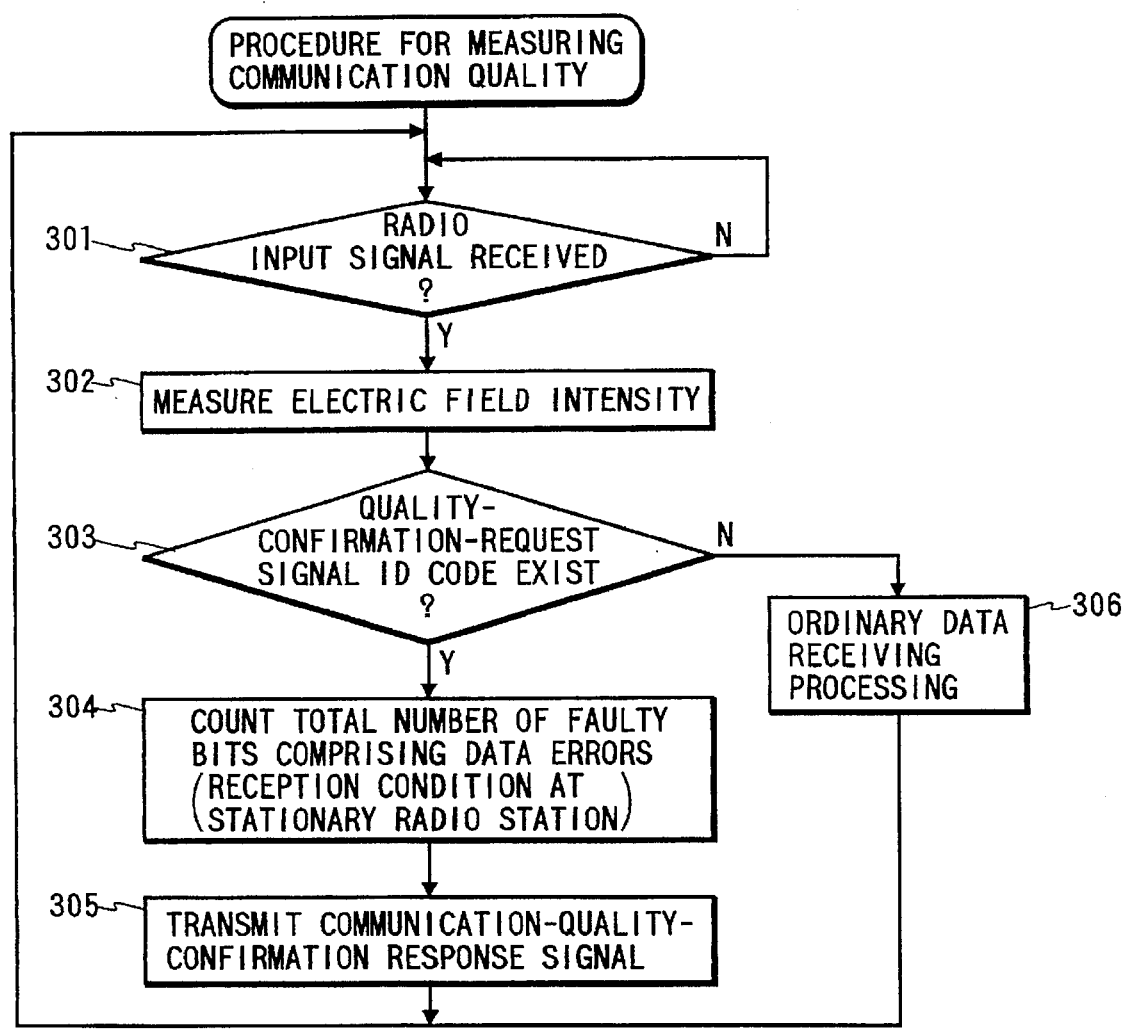

RADIO DATA COMMUNICATION SYSTEM COMPRISING A COMMON BASE RADIO STATION AND HANDY RADIO TERMINALS

BACKGROUND OF THE INVENTION

1. Field of the Invention:

This invention relates to an improvement in securing excellent quality in mutual radio communication paths between plural radio stations in a radio data communication system, and an effective investigation for finding out an optimum spot for locating a stationary radio station, such as a central data processing unit, in a facility wherein a plurality of portable radio terminals, such as handy bar-code readers, are provided.

2. Related Art:

Many of advanced factories have recently employed production lines whose production is totally administrated by using bar codes. More specifically, each area (i.e. a work or production station) in a factory is provided with a dedicated handy radio bar-code reader to read information from respective bar codes put on parts or components conveyed on the production line. The readout information are radio transmitted from respective handy bar-code readers to a central data processing unit for processing collected data as a whole. In this manner, usage of portable radio terminals in data transmission is widespread nowadays.

However, radio communications are generally inferior to cable communications in their communication qualities; thus the data transmissions using radio waves are inherently subjected to relatively higher error rates. For example, the presence of any obstructions in the communication path will worse the stability of electric field intensity in received radio waves, and the presence of disturbance radio noises will deteriorate the communication quality of radio transmission. Therefore, in introducing such a radio data communication system, it will be inevitably necessary to confirm the communication quality for assuring reliability and to find out an optimum spot for installing the stationary station.

According to conventional technologies, there is proposed an idea that electric field intensity information and noise information are used for judging the communication quality at a portable radio station (refer to the unexamined Japanese patent application No. 5-207844/1993). Or, there is known an idea that a test of radio communication quality is performed by measuring bit errors of a test signal between stationary and portable radio stations (refer to the unexamined Japanese patent application 62-224134/1987).

However, according to the technology disclosed in the unexamined Japanese patent application No. 5-207544/1993, the communication quality judged is unidirectional because the communication quality in this case only reflects the data measured in the data transmission from the opponent radio station to the concerned portable radio station. If any noise source exists in the vicinity of the portable radio station, this noise source will give an adverse effect to the evaluation of the communication quality between the stationary and portable radio stations. In other words, relying such a unidirectional measurement of communication quality is not accurate and not reliable in detecting the genuine quality of communication between the stationary and portable radio stations.

On the other hand, according to the technology disclosed in the unexamined Japanese patent application No. 62-224134/1987, the bit error measurement data reflects a unified or totalized quality in the radio communication between the stationary and portable radio stations. If radio signals emitted from the stationary radio station are different from those emitted from the portable radio station in their frequencies or output powers, the communication quality will be different in each communication path, i.e. in a data transmission path from the stationary radio station to the portable radio station, and in the other data transmission path from the portable radio station to the stationary radio station. Thus, measuring a unified or totalized communication quality between the stationary and portable radio stations is not accurate and not reliable in detecting the genuine communication quality in each data transmission path between the stationary and portable radio stations.

SUMMARY OF THE INVENTION

Accordingly, in view of above-described problems encountered in the related art, a principal object of the present invention is to provide a radio communication system capable of accurately detecting the quality of mutual communication between stationary and portable radio stations.

In order to accomplish this and other related objects, one aspect of the present invention provides a radio communication system for performing radio communication between first and second radio stations, comprising: communication-quality-confirmation request signal transmitting means provided in the first radio station for transmitting a communication-quality-confirmation request signal from the first radio station to the second radio station, the communication-quality-confirmation request signal including a first predetermined pattern data; second-radio-station measuring means provided in the second radio station for memorizing a first referential pattern data constructed by pattern data corresponding to the first predetermined pattern data, receiving the first predetermined pattern data involved in the communication-quality-confirmation request signal transmitted from the first radio station, and producing second-radio-station measuring data by comparing the first predetermined pattern data with the first referential pattern data; communication-quality-confirmation response signal transmitting means provided in the second radio station for transmitting a communication-quality-confirmation response signal from the second radio station to the first radio station, the communication-quality-confirmation response signal including a second predetermined pattern data and the second-radio-station measuring data produced by the second-radio-station measuring means; first-radio-station measuring means provided in the first radio station for memorizing a second referential pattern data constructed by pattern data corresponding to the second predetermined pattern data, receiving the second predetermined pattern data and the second-radio-station measuring data involved in the communication-quality-confirmation response signal transmitted from the second radio station, and producing first-radio-station measuring data by comparing the second predetermined pattern data with the second referential pattern data; and display means provided in the first radio station for displaying the first measuring data measured by the first-radio-station measuring means together with the second measuring data measured by the second-radio-station measuring means, thereby indicating quality of radio communication between the first and second radio stations.

In the above radio communication system, it is preferable to comprise: second-radio-station electric field intensity measuring means provided in the second radio station for measuring an electric field intensity of the communication-quality-confirmation request signal when the communication-quality-confirmation request signal is received; electric field intensity transmitting means provided in the second radio station for transmitting a second-radio-station field intensity signal to the first radio station, the second-radio-station field intensity signal comprising information relating to the electric field intensity measured by the second-radio-station electric field intensity measuring means; first-radio-station electric field intensity measuring means provided in the first radio station for receiving the second-radio-station field intensity signal transmitted from the electric field intensity transmitting means and producing a first-radio-station field intensity signal by measuring an electric field intensity of the second-radio-station field intensity signal received; and electric field intensity display means provided in the first radio station for displaying electric field intensity information of the first and second radio stations independently based on the first-radio-station field intensity signal measured by the first-radio-station electric field intensity measuring means and the second-radio-station field intensity signal measured by the second-radio-station electric field intensity measuring means.

In one preferable mode, the first radio station is a portable radio station, while the second radio station is a stationary radio station. And, a total number of the first radio station is larger than a total number of the second radio station.

Furthermore, one preferable radio communication system in accordance with the present invention will further comprise: radio wave environment information generating means for generating radio wave environment information by successively measuring radio wave environment at an operating place of the portable radio station; radio wave environment information memory means for memorizing the radio wave environment information; and radio wave environment information display means for displaying the radio wave environment information.

More specifically, the radio wave environment information generating means produces plural radio wave environment information by successively measuring a radio wave environment with respect to each of a plurality of communication paths; the radio wave environment information memory means memorizes the plural radio wave environment information; and the radio wave environment information display means displays the plural radio wave environment information.

Still further, in a preferable radio communication system in accordance with the present invention, the first radio station may comprise judging means for checking whether the second radio station returns the communication-quality-confirmation response signal within a predetermined time after the communication-quality-confirmation signal is transmitted from the first radio station to the second radio station.

When no response signal is returned from the second radio station within the predetermined time, the display means will display a warning that indicates difficulty of receiving the second-radio-station measuring data.

More specifically, the second-radio-station measuring means will count a total number of faulty bits having data errors by comparing the first predetermined pattern data with the first referential pattern data, thereby producing the second-radio-station measuring data based on the total number of the faulty bits.

Similarly, the first-radio-station measuring means will count a total number of faulty bits having data errors by comparing the second predetermined pattern data with the second referential pattern data, thereby producing the first-radio-station measuring data based on the total number of the faulty bits.

BRIEF DESCRIPTION OF THE DRAWINGS

The above and other objects, features and advantages of the present invention will become more apparent from the following detailed description which is to be read in conjunction with the accompanying drawings, in which:

FIG. 5 is a flow chart showing a procedure for measuring communication quality between the portable and stationary radio stations in accordance with the embodiment of present invention;

FIG. 6 is a view showing data construction of standardized packets for a communication-quality-confirmation request signal in accordance with the embodiment of present invention;

FIG. 7 is a view showing data construction of standardized packets for a communication-quality-confirmation response signal in accordance with the embodiment of present invention;

FIG. 8 is a view showing an example of the display screen used in the embodiment of the present invention;

FIG. 9 is a flow chart showing the procedure executed by a control unit of the stationary radio station, for measuring communication path quality, in accordance with the embodiment of the present invention;

DETAILED DESCRIPTION OF THE PREFERRED EMBODIMENT

A preferred embodiment of the present invention will be explained in greater detail hereinafter, with reference to the accompanying drawings.

Figure 1:
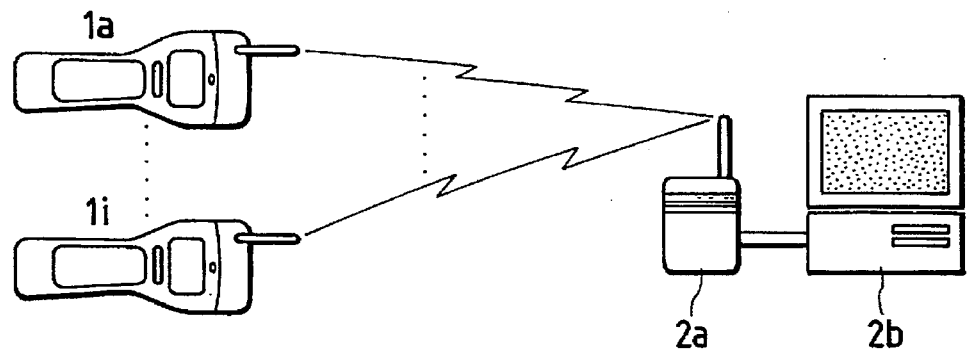
FIG. 1 is a schematic view showing a radio data communication system comprising a stationary radio station and plural radio stations in accordance with one embodiment of the present invention.

FIG. 1 is a schematic view showing a radio data communication system comprising a stationary radio station and plural radio stations in accordance with one embodiment of the present invention. More specifically, a plurality of (for example, nine) portable radio stations 1a–1i, such as handy bar-code reader units, are associated with a single stationary radio station 2a (i.e. base radio station) which is connected to a dedicated computer 2b. Each of plural portable radio stations 1a–1i collects data and transmits them to the stationary radio station 2a. The computer 2b processes these data sent from the portable radio stations 1a–1i. For example, each of the plural portable radio stations 1a–1i acts as a handy radio terminal provided in a designated area of a production line in a factory, for reading out information from bar codes put on parts or components conveyed on the production line and transmitting these data to the stationary radio station 2a. The computer 2b may be connected to a host computer of a company through a data line network.

Figure 2:
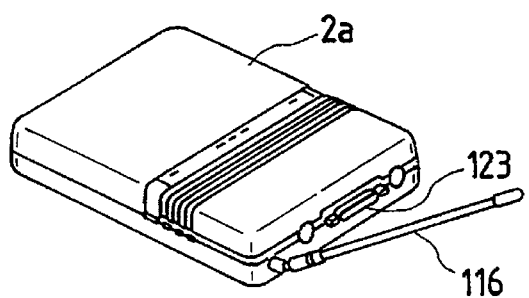
FIG. 2 is a perspective view showing an appearance of one example of the stationary radio station employed in the embodiment of present invention.

FIG. 2 is a perspective view showing an appearance of one example of the stationary radio station 2a employed in the embodiment of present invention. The stationary radio station 2a is equipped with an antenna 116 for receiving and transmitting radio waves carrying radio frequency signals and a connecting port (i,e, interface section) 123 provided for the linkage to the computer 2b. The stationary radio station 2a is located and fixed on an appropriate portion, for example, on a ceiling, a side wall or a table in the factory, for receiving radio frequency signals transmitted from the portable radio stations 1a–1i, giving and taking data to and from the computer 2b, and transmitting radio frequency signals to the portable radio stations 1a–1i.

Figure 3:
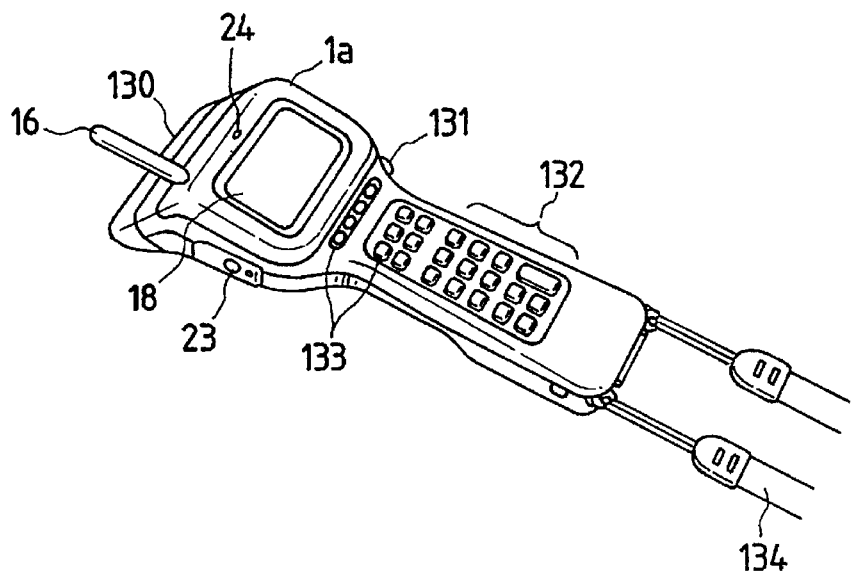
FIG. 3 is a perspective view showing an appearance of one example of the portable radio station employed in the embodiment of present invention.

FIG. 3 is a perspective view showing an appearance of one example of the portable radio station 1a employed in the embodiment of present invention. The portable radio station 1a comprises a reading hole 130 which optically reads bar codes using laser or the like, a trigger switch 131 which is depressed when bar codes are read, numerical keys 132 which are used for inputting numerical data, function keys 133 which are used for selecting functions, and neck straps 134 which are used when the portable radio station 1a is hung around a neck of an operator. The trigger switch 131, the numerical keys 132 and the function keys 133 cooperatively constitute a keyboard 22 of the portable radio station 1a. The portable radio station 1a further comprises an indicator lamp (indicating section) 24 which indicates an execution of each reading operation, an antenna 18 which is used for transmitting and receiving radio frequency signals, a display unit 18 such as an LCD (liquid crystal display) which displays various data and communication quality information using letters and graphic patterns, and an interface 23 equipped with a connector to be linked via a cable to an external computer or the like for processing data.

Figure 4:
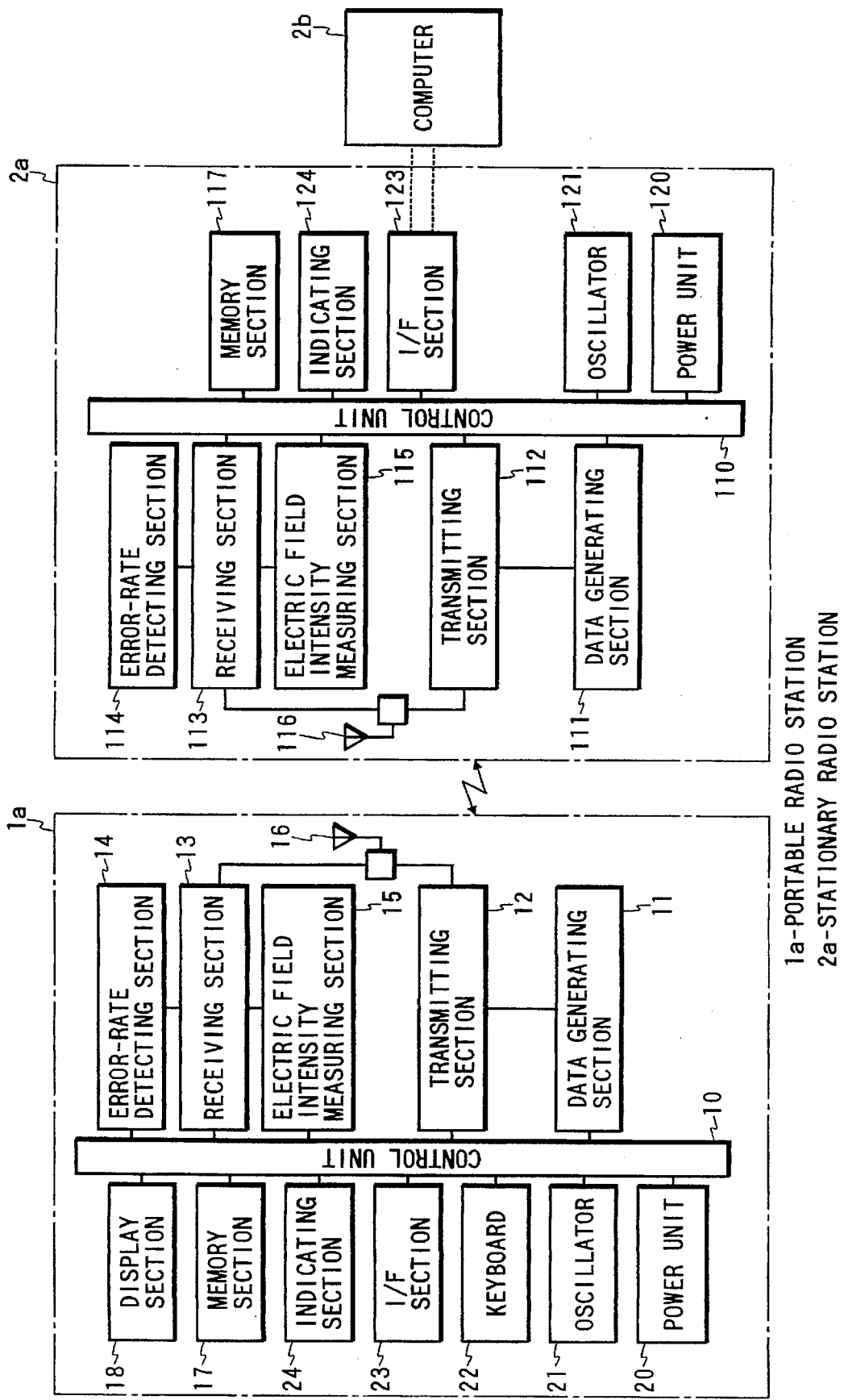
FIG. 4 is a schematic block diagram showing internal construction of the portable radio station and the stationary radio station to be used in the embodiment of the present invention.

FIG. 4 is a schematic block diagram showing internal construction of the portable radio station 1a and the stationary radio station 2a to be used in the embodiment of the present invention. The portable radio station 1a comprises a control unit 10 which includes a micro computer and executes various controls and data processing, a data generating section 11 which generates data, a transmitting section 12 which modulates digital data into radio frequency signals and sends them to an antenna 16 later described, a receiving section 13 which demodulates radio frequency signals into digital data for internal data processing, an error-rate detecting section 14 which analyzes and detects error rates of the reception signals, and an electric field intensity measuring section 15 which measures an electric field intensity of the reception radio wave. The antenna 16, as described above, transmits the radio frequency signals supplied from the transmitting section 12 to the air in the form of radio wave and also receives radio waves transmitted from other radio stations. The display section 18 displays data contents and analyzed information. The keyboard 22 includes above-explained trigger switch 131, numerical keys 132 and function keys 133 used for inputting numerical data and various commands.

The portable radio station 1a further comprises a memory section 17 which memorizes data signals processed in the portable radio station 1a, an electric power unit 20 which supplies electric power to operate the portable radio station 1a, and an oscillator 21 which is used for operating the micro computer of the control unit 10. The interface section 23 provides a linkage to an external device such as another computer. The indicating section 24 provides predetermined alarms and notices using appropriate visual indicating means, such as an LED, together with appropriate sound indicating means, such as a buzzer.

The stationary radio station 2a comprises a control unit 110 which includes a micro computer and executes various controls and data processing, a data generating section 111 which generates data, a transmitting section 112 which modulates digital data into radio frequency signals and sends them to an antenna 118 later described, a receiving section 113 which demodulates radio frequency signals into digital data for internal data processing, an error-rate detecting section 114 which analyzes and detects error rates of the reception signals, and an electric field intensity measuring section 115 which measures an electric field intensity of the reception radio wave. The antenna 116, as described above, transmits the radio frequency signals supplied from the transmitting section 112 to the air in the form of radio wave and also receives radio waves transmitted from other radio stations.

The stationary radio station 2a further comprises a memory section 117 which memorizes data signals processed in the stationary radio station 2a, an electric power unit 120 which supplies electric power to operate the stationary radio station 2a, and an oscillator 121 which is used for operating a micro computer of the control unit 110. The interface section 123 provides the linkage to the associated computer 2b. An indicating section 124 provides predetermined alarms and notices using appropriate visual indicating means, such as an LED, together with appropriate sound indicating means, such as a buzzer.

The in-house radio data communication system above-described performs operations for confirming quality of each communication path and finding out an optimum communication path having excellent quality. For the purpose of simplifying the explanation, the system consists of a single portable radio station (i.e. handy radio terminal) and a single stationary radio station (i.e. a base radio station). It is needless to say that the operation for investigating the quality of each communication path in accordance with the present invention can be employed in the system consisting of a plurality of portable radio stations and a single stationary radio station. For example, an operator, carrying one portable radio station, can go round the areas in the facility provided with plural portable radio stations to collect data in each area. When required to find out an optimum spot for locating the stationary radio station among a plurality of candidate places, a group of measuring data will be collected in each candidate place so as to represent each communication quality between the stationary radio station and each of the plural portable radio stations. Then, the optimum spot is decided by mutually comparing the collected data among the candidate places.

Details of confirming the quality of each communication path will be explained with reference to the flow chart of FIG. 5.

First of all, when an operator requests the confirmation of communication quality, he/she depresses a confirmation request button, one of the function keys 133 shown in FIG. 3, on the keyboard 22 of the portable radio station 1a. In response to the depression of the confirmation request button, the control unit 10 forms standardized packets of data supplied from the data generating section 11 as a communication-quality-confirmation request signal, and the transmitting section 12 transmits this communication-quality-confirmation request signal through the antenna 16 to the stationary radio station 2a (Step 201).

The standardized packets for a communication-quality-confirmation request signal has an arrangement shown in FIG. 6, which includes a sync code "a", an opponent station address "b", a own station address "c", a quality-confirmation-request signal identification (ID) code "d", a control section error-correcting code "e", and a quality-confirmation pattern data "f". The quality-confirmation pattern data "f" is a 256-byte data expressible from OO to FF in the hexadecimal notation.

The stationary radio station 2a receives the communication-quality-confirmation request signal through its antenna 116 at the receiving section 113. Meanwhile, the electric field intensity measuring section 115 measures an electric field intensity of the received signal at this moment, i.e. at the reception of the communication-quality-confirmation request signal (Step 202). Due to presence of the quality-confirmation-request signal ID code "d", it is possible to make a judgement as to whether or not a received signal is a communication-quality-confirmation request signal. When the quality-confirmation-request signal ID code "d" is detected, the stationary radio station 2a performs the measurements of communication quality as described later. Meanwhile, an ordinary data signal has another code "d" indicating an ordinary signal instead of the quality-confirmation-request signal ID code. Thus, when a received signal has such a code "d" indicating an ordinary signal, that signal is processed in an ordinary data reception processing.

Of reception signals, the packet data "a", "b", "c" and "d" correspond to the control section, and these data, even if they are subjected to transmission error, are correctly demodulated using the control section error-correcting code "e" for succeeding data processing. However, the quality-confirmation pattern data "f" is not error corrected even if an error is generated, and is therefore directly sent to the error-rate detecting section 114 without any error correction. The error-rate detecting section 114 compares the quality-confirmation pattern data "f" with a predesignated correct pattern data to find out errors and count a total number of faulty bits comprising data errors (Step 203). Subsequently, the stationary radio station 2a produces a communication-quality-confirmation response signal, constructed by standardized packets of data, including the total number of faulty bits in the quality-confirmation pattern data "f" as a reception quality information at the stationary radio station 2a, together with the measured electric field intensity and the quality-confirmation pattern data. The transmitting section 112 sends the communication-quality-confirmation response signal via the antenna 116 to the portable radio station 1a (Step 204). The standardized packets for a communication-quality-confirmation response signal has an arrangement shown in FIG. 7, which includes a sync code "g", an opponent station address "h", a own station address "i", a quality-confirmation-response signal identification (ID) code "j", an electric field intensity "k" at reception, a total number "l" of faulty bits in the quality-confirmation pattern data, a control section error-correcting code "m", and a quality-confirmation pattern data "n" The quality-confirmation pattern data "n" is a 258-byte data expressible from 00 to FF in the hexadecimal notation, as well as the communication-quality-confirmation request signal above described.

The portable radio station 1a receives the communication-quality-confirmation response signal at the receiving section 13 through the antenna 16. At the same time, the electric field intensity measuring section 15 measures an electric field intensity at this moment, i.e. at the reception of the communication-quality-confirmation response signal (Step 205). Due to presence of the quality-confirmation-response signal ID code "j", it is possible to make a judgement as to whether or not a received signal is a communication-quality-confirmation response signal. When the quality-confirmation-response signal ID code "j" is detected, the portable radio station 1a receives the communication quality information transmitted and performs the measurements of communication quality in a manner described later. Meanwhile, an ordinary data signal has another code "j" indicating an ordinary signal instead of the quality-confirmation-response signal ID code. Thus, when a received signal has such a code "j" indicating an ordinary signal, that signal is processed in an ordinary data reception processing.

Of reception signals, the packet data "g", "h", "i", "j", "k" and "1" correspond to the control section, and these data, even if they are subjected to transmission error, are correctly demodulated using the control section error-correcting code "m" for succeeding data processing. However, the quality-confirmation pattern data "n" is not error corrected even if an error is generated, and is therefore directly sent to the error-rate detecting section 14 without any error correction. The error-rate detecting section 14 compares the quality-confirmation pattern data "n" with a predesignated correct pattern data to find out errors and count a total number of faulty bits comprising data errors (Step 208), thereby producing a reception quality information at the portable radio station 1a.

Subsequently, the portable radio station 1a stores thus measured communication quality information into the memory 17 and display the communication quality information on the display section 18 (Step 207). The communication quality information, stored and displayed, include the total number of faulty bits detected by and transmitted from the stationary radio station 2a (i.e. reception quality information at the stationary radio station 2a) and the total number of faulty bits detected by the portable radio station 1a (i.e. reception quality information at the portable radio station 1a), both being expressed in terms of an error rate per 1,000 bits. The electric field intensities (i.e. reception levels) measured in the above measurements are also stored in the memory section 17 and displayed on the display section 18. FIG. 8 shows details of display by the display section 18. That is, the content to be displayed by the portable station 1a is as follows.

(1) STATIONARY RADIO STATION RECEIVING CONDITION: ERROR RATE: 3/1000 RECEPTION LEVEL: 7

(2) PORTABLE RADIO STATION RECEIVING CONDITION: ERROR RATE: 0/1000 RECEPTION LEVEL: 9

If the portable radio station 1a, after it transmits the communication-quality-confirmation request signal to the stationary radio station 2a, dose not receive the communication-quality-confirmation response signal to be returned from the stationary radio station 2a within a predetermined time, the control unit 10 will cause the display section 18 to display an indication of "uncountable".

Hereinafter, the above-described communication quality confirming operation will be further explained as procedures in respective stationary and portable radio stations with reference to the flow charts shown in FIGS. 9 and 10.

FIG. 9 is a flow chart showing the procedure executed by the control unit 110 of the stationary radio station 2a. First, in a step 301, the control unit 110 waits any radio input signal being input from the portable radio station 1a by repeatedly checking whether any radio input signal is received at the receiving section 113. Once the radio input signal is received from the portable radio station 1a, the control unit 110 proceeds to a step 302 to measure an electric field intensity of radio wave carrying the received radio input signal transmitted from the portable radio station 1a. Subsequently, in a step 303, the control unit 110 checks whether the received radio input signal comprises a quality-confirmation request signal ID code ("d" in FIG. 8). If the quality-confirmation-request signal ID code does not exist in the received radio input signal, the control unit 110 regards the received radio signal as an ordinary data signal and proceeds to a step 308 to execute an ordinary data reception processing. On the contrary, if the quality-confirmation-request signal ID code exists in the received radio input signal, the control unit 110 regards the received radio signal as the communication-quality-confirmation request signal and proceeds to a step 304 to analyze the quality-confirmation pattern data ("f" in FIG. 6) transmitted from the portable radio station 1a by comparing the quality-confirmation pattern data with the predesignated correct pattern data and then count the total number of faulty bits comprising data errors, thereby producing the reception quality information at the stationary radio station 2a. After that, the control unit 110 proceeds to a step 305 to produce the communication-quality-confirmation response signal and transmit it to the portable radio station 1a. The communication-quality-confirmation response signal, in this case, are constructed by standardized packets of data comprising the reception quality information ("1" in FIG. 7) at the stationary radio station 2a obtained in the step 304, together with the sync code "g", the opponent station address "h", the own station address "i", the quality-confirmation response signal ID code "j", the electric field intensity "k" at reception, the control section error-correcting code "m" and the quality-confirmation pattern data "n"(refer to FIG. 7).

Figure 10:
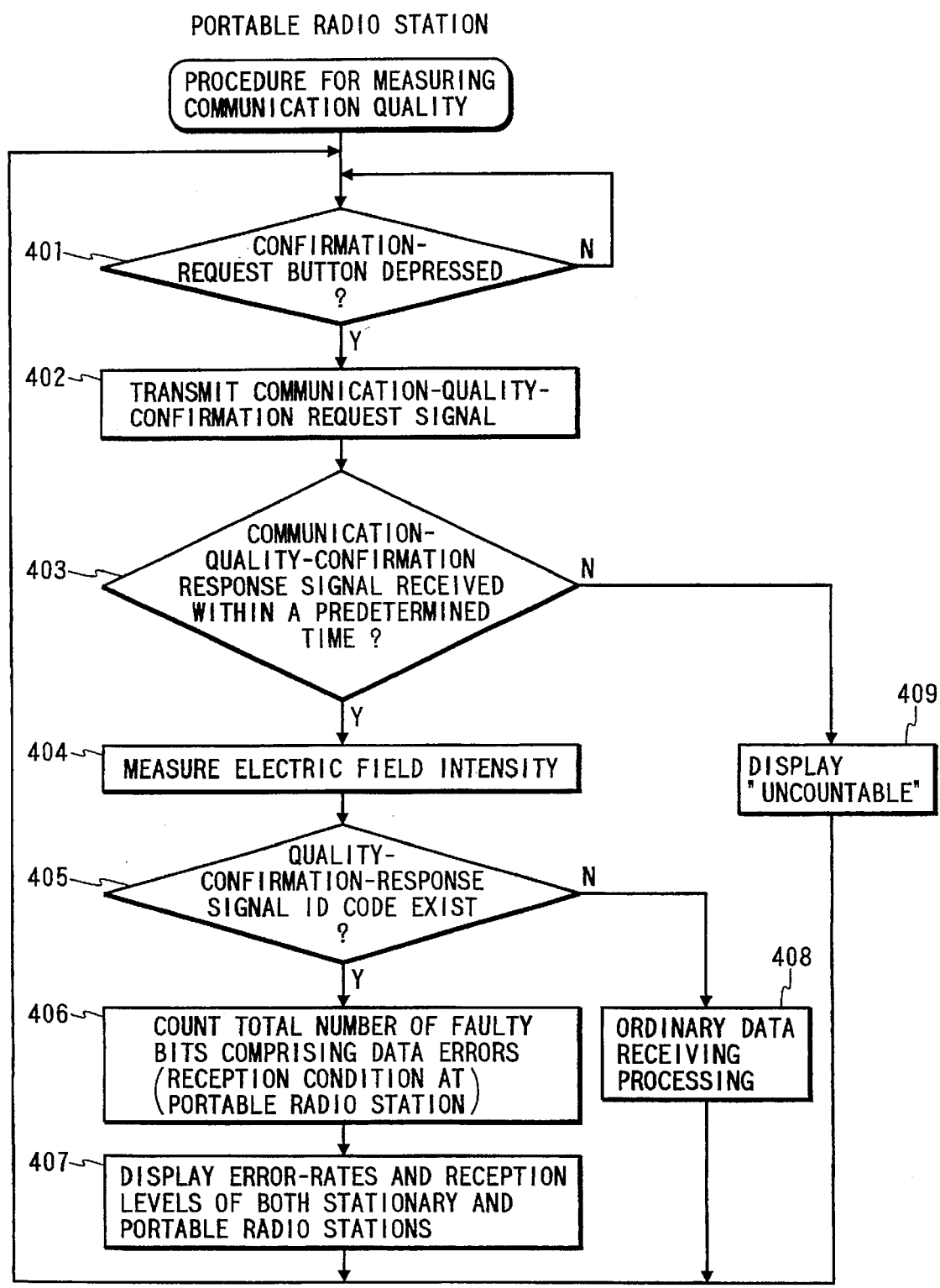
FIG. 10 is a flow chart showing the procedure executed by a control unit of the portable radio station, for measuring communication path quality, in accordance with the embodiment of the present invention.

FIG. 10 is a flow chart showing the procedure executed by the control unit 10 of the portable radio station 1a. First, in a step 401, the control unit 10 checks whether the confirmation request button is depressed. Once the confirmation request button is depressed, the control unit 10 proceeds to a step 402 to construct the communication-quality-confirmation signal explained with reference to FIG. 6 and transmit thus formed communication-quality-confirmation signal to the stationary radio station 2a. Thereafter, the control unit 10 checks in a step 403 whether the stationary radio station 2a returns the communication-quality-confirmation response signal within a predetermined time after the communication-quality-confirmation signal is transmitted from the portable radio station 1a to the stationary radio station 2a.

If no response signal is returned from the stationary radio station 2a within the predetermined time, the control unit 10 proceeds to a step 409 to cause the display section 18 to display a warning "uncountable" that indicates difficulty of receiving any communication quality from the stationary radio station 2a. Meanwhile, if the communication-quality-confirmation response signal is returned from the stationary radio station 2a within the predetermined time, the control unit 10 proceeds to a step 404 to measure an electric field intensity of radio wave carrying the communication-quality-confirmation response signal transmitted from the stationary radio station 2a. Subsequently, in a step 405, the control unit 10 checks whether or not the received radio signal comprises a quality-confirmation response signal ID code ("j" in FIG. 7). If the quality-confirmation response signal ID code does not exist in the received radio signal, the control unit 10 regards the received radio signal as an ordinary data signal and proceeds to a step 408 to execute an ordinary data reception processing. On the contrary, if the quality-confirmation response signal ID code exists in the received radio signal, the control unit 10 regards the received radio signal as the communication-quality-confirmation request signal and proceeds to a step 408 to analyze the quality-confirmation pattern data ("n" in FIG. 7) transmitted from the stationary radio station 2a by comparing the quality-confirmation pattern data with the predesignated correct pattern data and then count the total number of faulty bits comprising data errors, thereby producing the reception quality information at the portable radio station 1a. After that, the control unit 10 proceeds to a step 407 to display error rates and reception levels of both the stationary and portable radio stations, as reception quality information, on the display section 18. More specifically, the error rates and reception levels to be displayed in the step 407 are the reception quality information ("1" in FIG. 7) of the stationary radio station 2a and the reception electric field intensity ("k" in FIG. 7) transmitted from the stationary radio station 2a, and the reception quality information of the portable radio station 1a produced in the step 406 and the reception electric field intensity measured at the portable radio station in the step 404.

Hereinafter explained is a method of selecting an optimum spot for locating the stationary radio station among a plurality of candidate places in a communication system consisting of a single stationary radio station and a plurality of portable radio stations, for securing excellent-quality communication paths between the stationary and portable radio stations.

Figure 11:
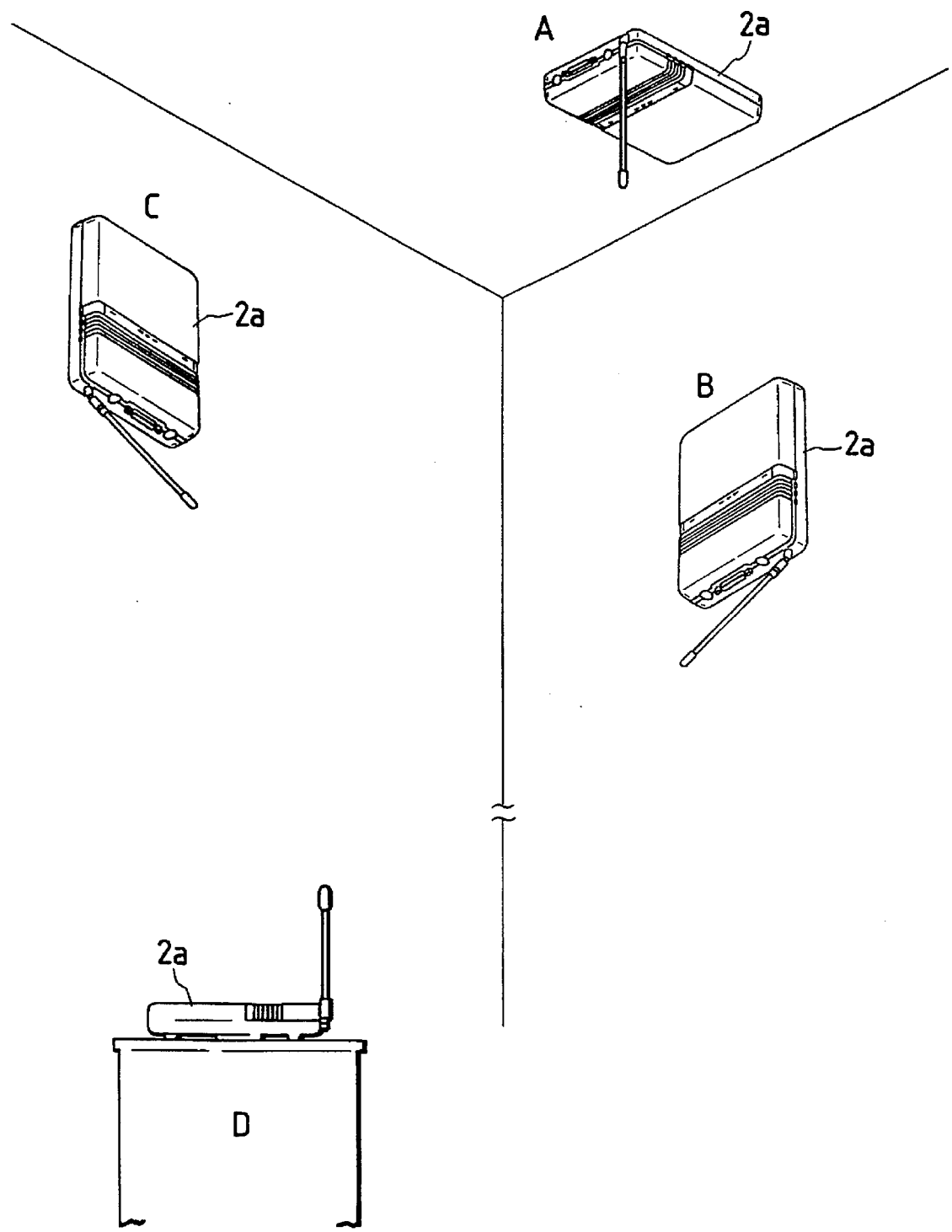
FIG. 11 is a view illustrating several spots selected as candidates for locating the common stationary radio station.

It is assumed that each of the portable radio stations is disposed in each of a plurality of areas in the facility. Several spots (for example, a ceiling "A", a side wall "B", another side wall "C" and a table "D" as shown in FIG. 11) are chosen as candidates preferable for locating the stationary radio station 2a. Next, to find out an optimum spot among these candidates, the stationary radio station 2a is successively put on each of these candidate places to measure and evaluate communication quality of the stationary radio station 2a relative to each of the plural portable radio stations. The following tables 1–4 show examples of measured data.

TABLE 1

| | CANDIDATE "A" | | | |
| --- | --- | --- | --- | --- |
| | STATIONARY RADIO STATION RECEPTION QUALITY INFORMATION | | PORTABLE RADIO STATION RECEPTION QUALITY INFORMATION | |
| | ERROR-RATE | RE-CEPTION LEVEL | ERROR-RATE | RE-CEPTION LEVEL |
| PORTABLE #1 | 3/1000 | 7 | 0/1000 | 9 |
| PORTABLE #2 | 0/1000 | 10 | 0/1000 | 10 |
| PORTABLE #3 | 1/1000 | 8 | 0/1000 | 10 |
| PORTABLE #4 | 2/1000 | 7 | 0/1000 | 9 |
| PORTABLE #5 | 5/1000 | 6 | 4/1000 | 7 |
| PORTABLE #6 | 2/1000 | 8 | 1/1000 | 9 |
| PORTABLE #7 | 0/1000 | 10 | 0/1000 | 10 |
| PORTABLE #8 | 6/1000 | 6 | 5/1000 | 6 |
| PORTABLE #9 | 0/1000 | 9 | 1/1000 | 8 |

TABLE 2

CANDIDATE "B"

| | STATIONARY RADIO STATION RECEPTION QUALITY INFORMATION | | PORTABLE RADIO STATION RECEPTION QUALITY INFORMATION | |
|---|---|---|---|---|
| | ERROR-RATE | RECEPTION LEVEL | ERROR-RATE | RECEPTION LEVEL |
| PORTABLE #1 | 0/1000 | 10 | 0/1000 | 10 |
| PORTABLE #2 | 2/1000 | 9 | 0/1000 | 9 |
| PORTABLE #3 | 0/1000 | 9 | 0/1000 | 9 |
| PORTABLE #4 | 1/1000 | 9 | 1/1000 | 9 |
| PORTABLE #5 | 3/1000 | 8 | 4/1000 | 7 |
| PORTABLE #6 | 2/1000 | 9 | 1/1000 | 9 |
| PORTABLE #7 | 0/1000 | 10 | 0/1000 | 9 |
| PORTABLE #8 | 5/1000 | 6 | 3/1000 | 7 |
| PORTABLE #9 | 1/1000 | 9 | 0/1000 | 10 |

TABLE 3

CANDIDATE "C"

| | STATIONARY RADIO STATION RECEPTION QUALITY INFORMATION | | PORTABLE RADIO STATION RECEPTION QUALITY INFORMATION | |
|---|---|---|---|---|
| | ERROR-RATE | RECEPTION LEVEL | ERROR-RATE | RECEPTION LEVEL |
| PORTABLE #1 | 0/1000 | 10 | 0/1000 | 9 |
| PORTABLE #2 | 0/1000 | 10 | 0/1000 | 10 |
| PORTABLE #3 | 0/1000 | 9 | 0/1000 | 10 |
| PORTABLE #4 | 1/1000 | 8 | 1/1000 | 9 |
| PORTABLE #5 | 3/1000 | 7 | 1/1000 | 8 |
| PORTABLE #6 | 0/1000 | 10 | 1/1000 | 9 |
| PORTABLE #7 | 1/1000 | 8 | 0/1000 | 9 |
| PORTABLE #8 | 2/1000 | 8 | 0/1000 | 9 |
| PORTABLE #9 | 0/1000 | 10 | 0/1000 | 10 |

TABLE 4

CANDIDATE "D"

| | STATIONARY RADIO STATION RECEPTION QUALITY INFORMATION | | PORTABLE RADIO STATION RECEPTION QUALITY INFORMATION | |
|---|---|---|---|---|
| | ERROR-RATE | RECEPTION LEVEL | ERROR-RATE | RECEPTION LEVEL |
| PORTABLE #1 | 4/1000 | 7 | 2/1000 | 8 |
| PORTABLE #2 | 3/1000 | 7 | 1/1000 | 9 |
| PORTABLE #3 | 3/1000 | 7 | 4/1000 | 7 |
| PORTABLE #4 | 6/1000 | 6 | 3/1000 | 8 |
| PORTABLE #5 | 9/1000 | 5 | 8/1000 | 4 |
| PORTABLE #6 | 1/1000 | 9 | 2/1000 | 8 |
| PORTABLE #7 | 5/1000 | 6 | 4/1000 | 7 |
| PORTABLE #8 | 7/1000 | 6 | 8/1000 | 5 |
| PORTABLE #9 | 4/1000 | 7 | 5/1000 | 6 |

From the above measuring data, it is known that the candidate "C" is the optimum spot to locate the stationary radio station 2a. Thus, the spot "C" is finally selected as a place for installing the stationary radio station 2a.

Next explained is a method of investigating electric wave environment, i.e. aerial conditions of each channel of the operated communication paths. That is, another aspect of the present invention provides a method of investigating what kind of radio wave is received through in each channel. This method is effective to know the presence of disturbance radio wave noises which cause the uncountable condition in the detection of communication quality.

Figure 12:
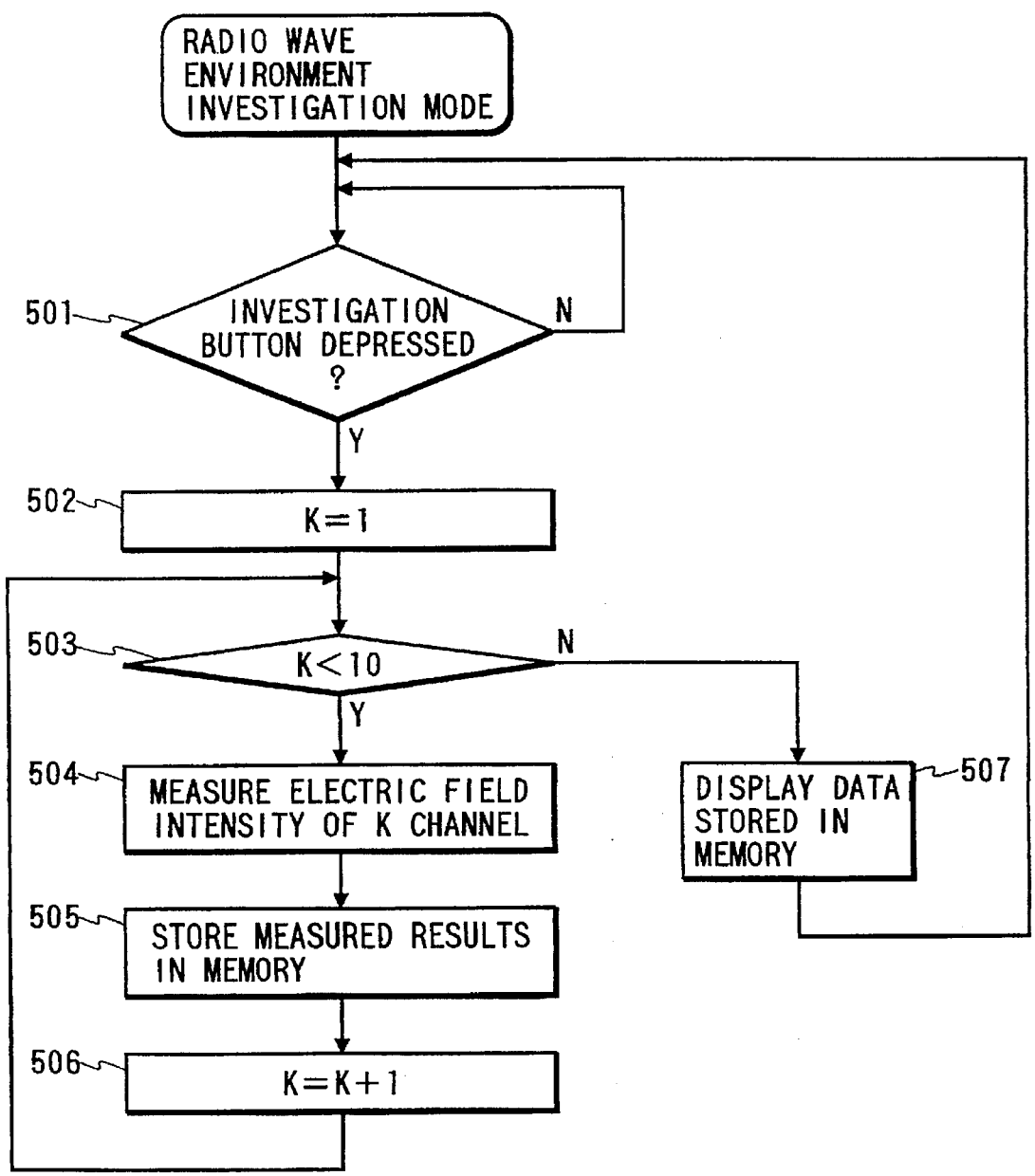
FIG. 12 is a flow chart showing a procedure for investigating radio wave environment, executed by the control unit of the portable radio station, in accordance with the embodiment of the present invention.

This investigating method will be explained below with reference to the flow chart of FIG. 12, executed by the control unit 10 of the portable radio station 1a. First, in a step 501, it is checked whether an investigation button, one of the function keys 133 shown in FIG. 3, is depressed. If the investigation button is depressed, the control unit 10 proceeds to a step 502.

The investigation button, in this case, is a push-on/push-off type (e.g. a mechanical lock or an electric circuit memory), which maintains an on-condition once the button is depressed until the button is next depressed, so that the investigation of radio wave environment can be continuously and successively carried out with respect to each of plural communication channels.

The portable radio station 1a periodically scans a total of nine channels sequentially from the #1 channel to #9 channel, taking 1-2 seconds for one complete cycle, to measure an electric field intensity of each channel.

Figure 13:
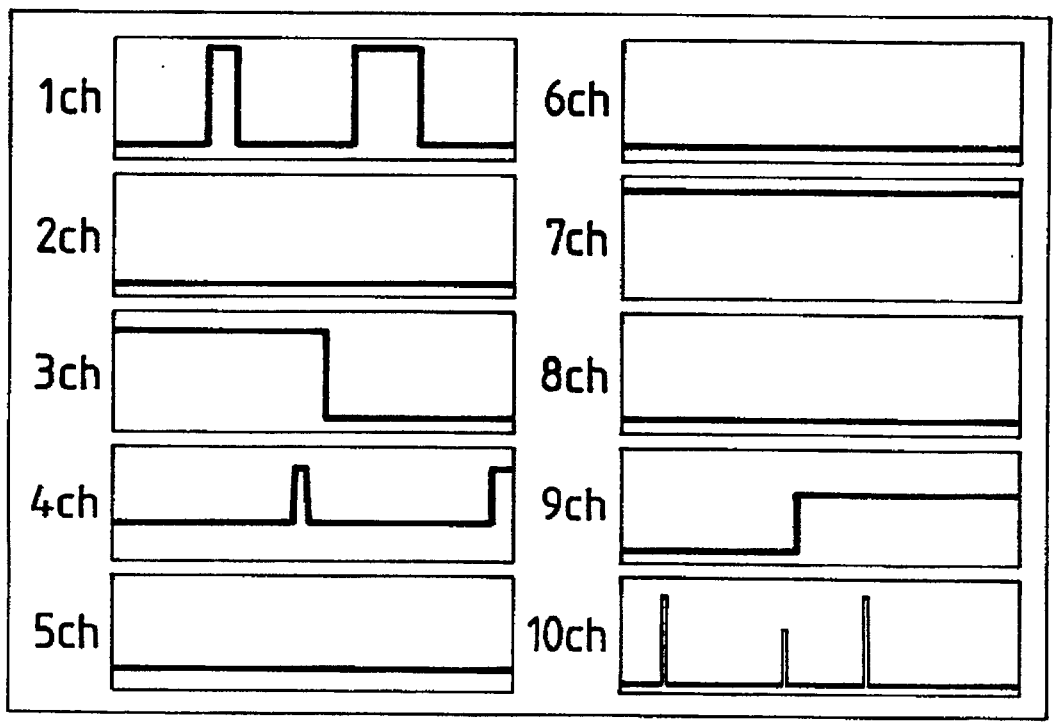
FIG. 13 is a view showing a display screen at the portable radio station for displaying radio wave environment measured.
Figure 14:
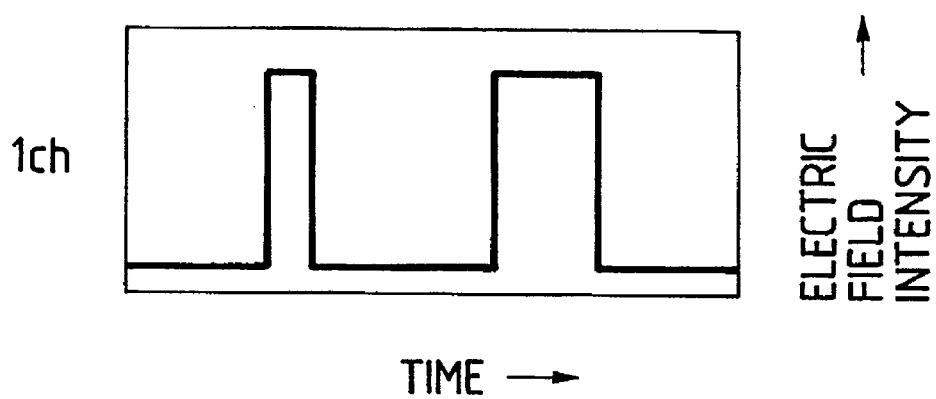
FIG. 14 is an enlarged view showing a part of the display screen shown in FIG. 13.

In the step 502, the control unit 10 initializes "K" whose value designates the number of a channel to be scanned. (i.e. K=1). Subsequently, the control unit 10 proceeds to a step 503 and checks whether the value of "K" is smaller than 10. If the value of "K" is smaller than 10, the control unit 10 proceeds to the step 504 to measure the electric field intensity of the designated channel "K". The measured data (i.e. radio wave environment information) is stored in the previously described memory section 17 (acting as a radio wave environment information memory means) in a step 505. Then, the control unit 10 proceeds to a step 506 and increments the value of "K" by adding 1 (i.e. K=K+1), thereafter returning the step 503. If the value of "K" exceeds 9, the control unit 10 proceeds to a step 507 to display the data stored in the memory section 17 on the display section 18 (acting as a radio wave environment display means). The data displayed in this case are the electric field intensities (i.e. radio wave environment information) of all the channels #1 through #9. The display section 18 displays these data by the dot-scan method whose exemplary display screen is shown in FIG. 13. More specifically, the screen of FIG. 13 displays a total of ten channels at a time, i.e. nine channels used for ordinary data transmission and one extra channel. FIG. 14 is an enlarged view showing the display of #1 channel, with an abscissa representing time whose full-scale value is equivalent to 5 minutes, and an ordinate representing the measured electric field intensity classified into 0-10 levels. Thus, the display section 18 scrolls the displayed information so as to always display the latest 5 minutes of information stored in the memory section 17. It is also possible to memorize the measured data in the memory section 17 so as to detect burst noises occurring.

From the display of #1 channel, it is understood that this channel was used for a short time and, after a passage of a significant time, was used again for a little bit longer time. On the other hand, the #2 and #8 channels were not used at all during the latest 5 minutes, with receiving no noises. The #3 channel was used by a strong (i.e. adjacent) radio station in the first half, but became an empty channel in the second half. The #4 channel was constantly subjected to a background noise of a medium level, and received a burst noise in the intermediate time, although it was used by a certain radio station at the end of the displayed measuring duration. The #5 and #6 channels were not used but constantly subjected to a background noise of a weak level. The #7 channel was entirely used for the duration of the displayed measuring time. The #9 channel was an empty channel in the first half, but is used by a medium (i.e. intermediate distance) radio station in the second half. Meanwhile, the #10 channel was entirely empty during the measuring time displayed, receiving a total of three large burst noises during that time.

In this manner, the present invention makes it feasible to easily investigate the radio wave environment with respect to all of the operating channels at the portable radio station, using information displayed on the screen thereof.

Although the present embodiment discloses the portable radio station equipped with the display section, it is also desirable to provide a display section on the stationary radio station. An advantage of providing a display section on the stationary radio station is that a user can check the communication quality by moving only one radio station (i.e. the stationary radio station) while watching the display screen of the stationary radio station in a test of finding out the optimum spot for installing the stationary radio station.

The merit of providing the display section on each portable radio station is that a user can promptly grasp the communication quality in every moment when the portable radio station is moved because the portable radio station is usually carried by an operator. Thus, the display section can be provided at either of the stationary and portable radio stations as occasions demand. Alternatively, it is also possible to provide display sections on both the stationary and portable radio stations. In any case, the present invention requires the display section to display each of the bidirectional communication qualities,—i.e. communication quality in data transmission of one direction from the stationary radio station to the portable radio station and another radio communication quality in data transmission of the other direction from the portable radio station to the stationary radio station.

As explained in the foregoing description, the present invention allows an operator to easily and independently check the communication quality of each radio data communication path among a plurality of radio stations, thereby assuring highly reliable radio data communication and greatly improving convenience. Furthermore, when the present invention is employed in a communication system comprising a common stationary radio station and numerous handy radio terminals, such as handy bar-code readers, the present invention enables us to find out an optimum spot for installing the common stationary radio station, which assures an excellent communication quality.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A radio communication system for performing radio communication between first and second radio stations, comprising:

communication-quality-confirmation request signal transmitting means provided in said first radio station for transmitting a communication-quality-confirmation request signal from said first radio station to said second radio station, said communication-quality-confirmation request signal including a first predetermined pattern data;

second-radio-station measuring means provided in said second radio station for memorizing a first referential pattern data constructed by pattern data corresponding to said first predetermined pattern data, receiving said first predetermined pattern data involved in said communication-quality-confirmation request signal transmitted from said first radio station, and producing second-radio-station measuring data by comparing said first predetermined pattern data with said first referential pattern data;

communication-quality-confirmation response signal transmitting means provided in said second radio station for transmitting a communication-quality-confirmation response signal from said second radio station to said first radio station, said communication-quality-confirmation response signal including a second predetermined pattern data and said second-radio-station measuring data produced by said second-radio-station measuring means;

first-radio-station measuring means provided in said first radio station for memorizing a second referential pattern data constructed by pattern data corresponding to said second predetermined pattern data, receiving said second predetermined pattern data and said second-radio-station measuring data involved in said communication-quality-confirmation response signal transmitted from said second radio station, and producing first-radio-station measuring data by comparing said second predetermined pattern data with said second referential pattern data; and display means provided in said first radio station for displaying said first measuring data measured by said first-radio-station measuring means together with said second measuring data measured by said second-radio-station measuring means, thereby indicating quality of radio communication between said first and second radio stations.

2. The radio communication system defined by claim 1, further comprises:

second-radio-station electric field intensity measuring means provided in said second radio station for measuring an electric field intensity of said communication-quality-confirmation request signal when said communication-quality-confirmation request signal is received;

electric field intensity transmitting means provided in said second radio station for transmitting a second-radio-station field intensity signal to said first radio station, said second-radio-station field intensity signal comprising information relating to said electric field intensity measured by said second-radio-station electric field intensity measuring means;

first-radio-station electric field intensity measuring means provided in said first radio station for receiving said second-radio-station field intensity signal transmitted from said electric field intensity transmitting means and producing a first-radio-station field intensity signal by measuring an electric field intensity of said second-radio-station field intensity signal received; and electric field intensity display means provided in said first radio station for displaying electric field intensity information of said first and second radio stations independently based on said first-radio-station field intensity signal measured by said first-radio-station electric field intensity measuring means and said second-radio-station field intensity signal measured by said second-radio-station electric field intensity measuring means.

3. The radio communication system defined by claim 1, wherein said first radio station is a portable radio station, while said second radio station is a stationary radio station.

4. The radio communication system defined by claim 3, further comprises:

radio wave environment information generating means for generating radio wave environment information by successively measuring radio wave environment at an operating place of said portable radio station;

radio wave environment information memory means for memorizing said radio wave environment information; and radio wave environment information display means for displaying said radio wave environment information.

5. The radio communication system defined by claim 4, wherein said radio wave environment information generating means produces plural radio wave environment information by successively measuring a radio wave environment with respect to each of a plurality of communication paths;

said radio wave environment information memory means memorizes said plural radio wave environment information; and said radio wave environment information display means displays said plural radio wave environment information.

6. The radio communication system defined by claim 1, wherein a total number of said first radio station is larger than a total number of said second radio station.

7. The radio communication system defined by claim 1, wherein said first radio station comprises judging means for checking whether said second radio station returns said communication-quality-confirmation response signal within a predetermined time after said communication-quality-confirmation signal is transmitted from said first radio station to said second radio station.

8. The radio communication system defined by claim 7, wherein said display means displays a warning that indicates difficulty of receiving said second-radio-station measuring data when no response signal is returned from said second radio station within the predetermined time.

9. The radio communication system defined by claim 1, wherein said second-radio-station measuring means counts a total number of faulty bits having data errors by comparing said first predetermined pattern data with said first referential pattern data, thereby producing said second-radio-station measuring data based on said total number of said faulty bits.

10. The radio communication system defined by claim 1, wherein said first-radio-station measuring means counts a total number of faulty bits having data errors by comparing said second predetermined pattern data with said second referential pattern data, thereby producing said first-radio-station measuring data based on said total number of said faulty bits.

* * * * *